Dec. 14, 1965  J. PERSIAUX  3,222,742
SELF-TIGHTENING CLAMPS
Filed Sept. 23, 1963  6 Sheets-Sheet 4

INVENTOR
JEAN PERSIAUX

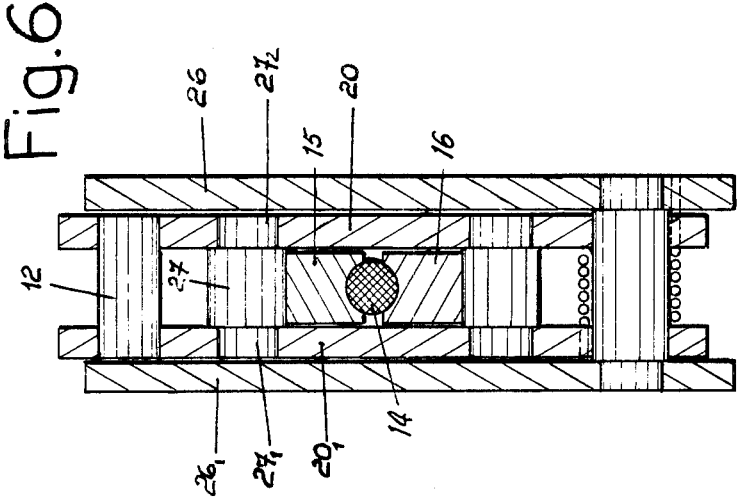
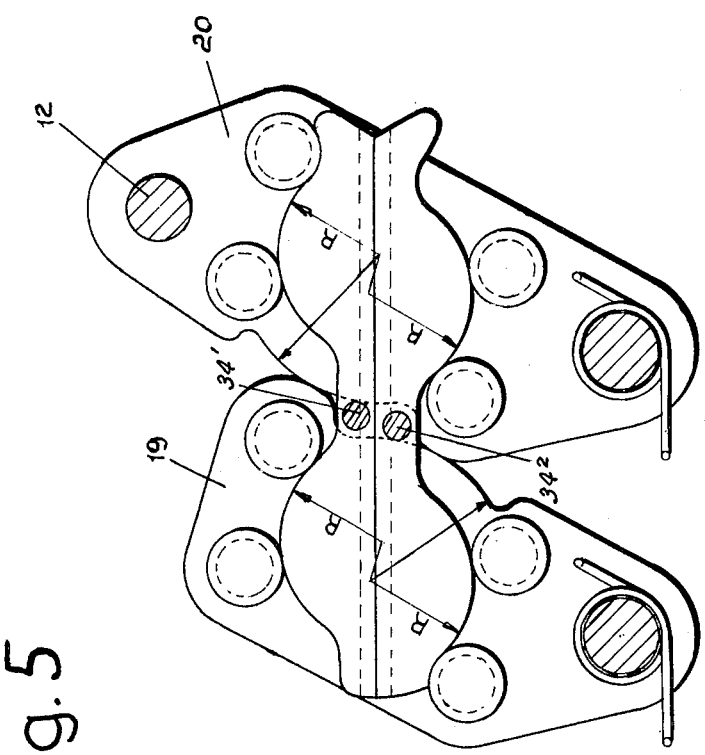

Dec. 14, 1965    J. PERSIAUX    3,222,742
SELF-TIGHTENING CLAMPS
Filed Sept. 23, 1963    6 Sheets-Sheet 6
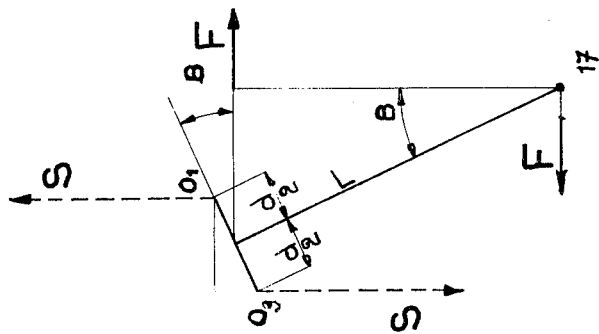
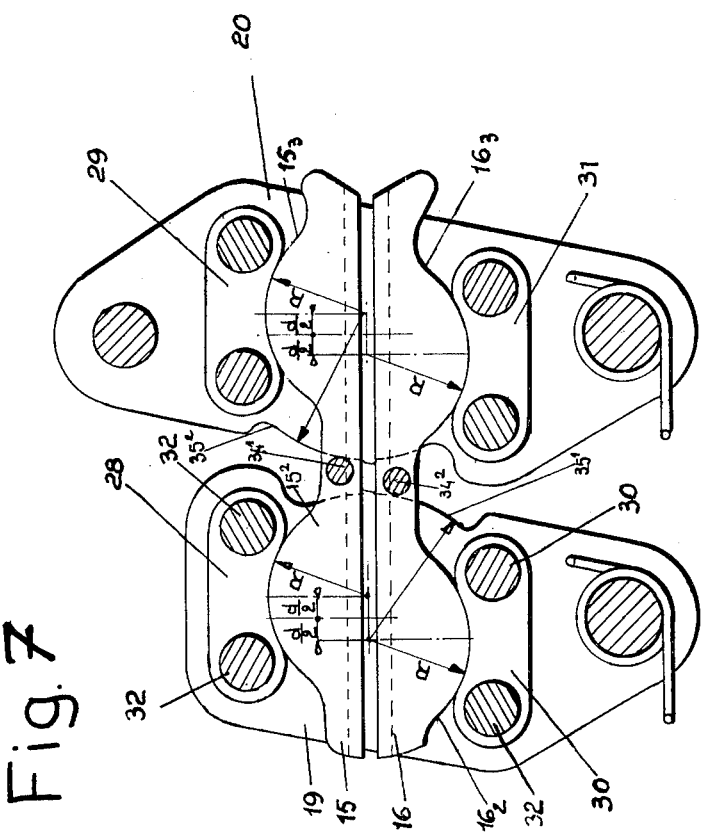
INVENTOR
JEAN PERSIAUX
*Imirie & Smiley*
ATTYS.

United States Patent Office 3,222,742
Patented Dec. 14, 1965

3,222,742
SELF-TIGHTENING CLAMPS
Jean Persiaux, Lannoy, France, assignor to Tractel S.A., Paris, France, a society of France
Filed Sept. 23, 1963, Ser. No. 310,551
Claims priority, application France, Sept. 27, 1962, 910,670, Patent 1,342,298
13 Claims. (Cl. 24—134)

Hauling and hoisting appliances are already known comprising two clamps each provided with a pair of parallel jaws mounted on pivoting side-plates in order to produce a forward and backward movement enabling an object to be hauled by means of a cable passing between the parallel jaws of each clamp.

In this known device the jaws have semi-cyclindrical bearings on their lateral walls which are arranged in openings also semi-cylindrical made in the pivoting side-plates and offset with regard to each other.

However, as these jaws have semi-cylindrical bearings on their lateral faces, their machining becomes complicated, which considerably increases the cost price of the hoisting appliance itself.

On the other hand, with these known devices, the friction torque on the semi-cylindrical bearings is relatively great, which reduces the mechanical output of said tightening device for the jaws, and hence the tightening coefficient of these jaws.

As compared with these known devices, the present invention has the object of a simple embodiment of self-tightening clamps and hence the simple production of hauling and hoisting appliances provided with these self-tightening clamps.

Another object of the invention is to produce self-tightening clamps having a slight friction coefficient and hence, a good mechanical output.

Another object of the invention is to produce a hauling and hoisting appliance that is strong: reliable when in operation.

Figure 1:
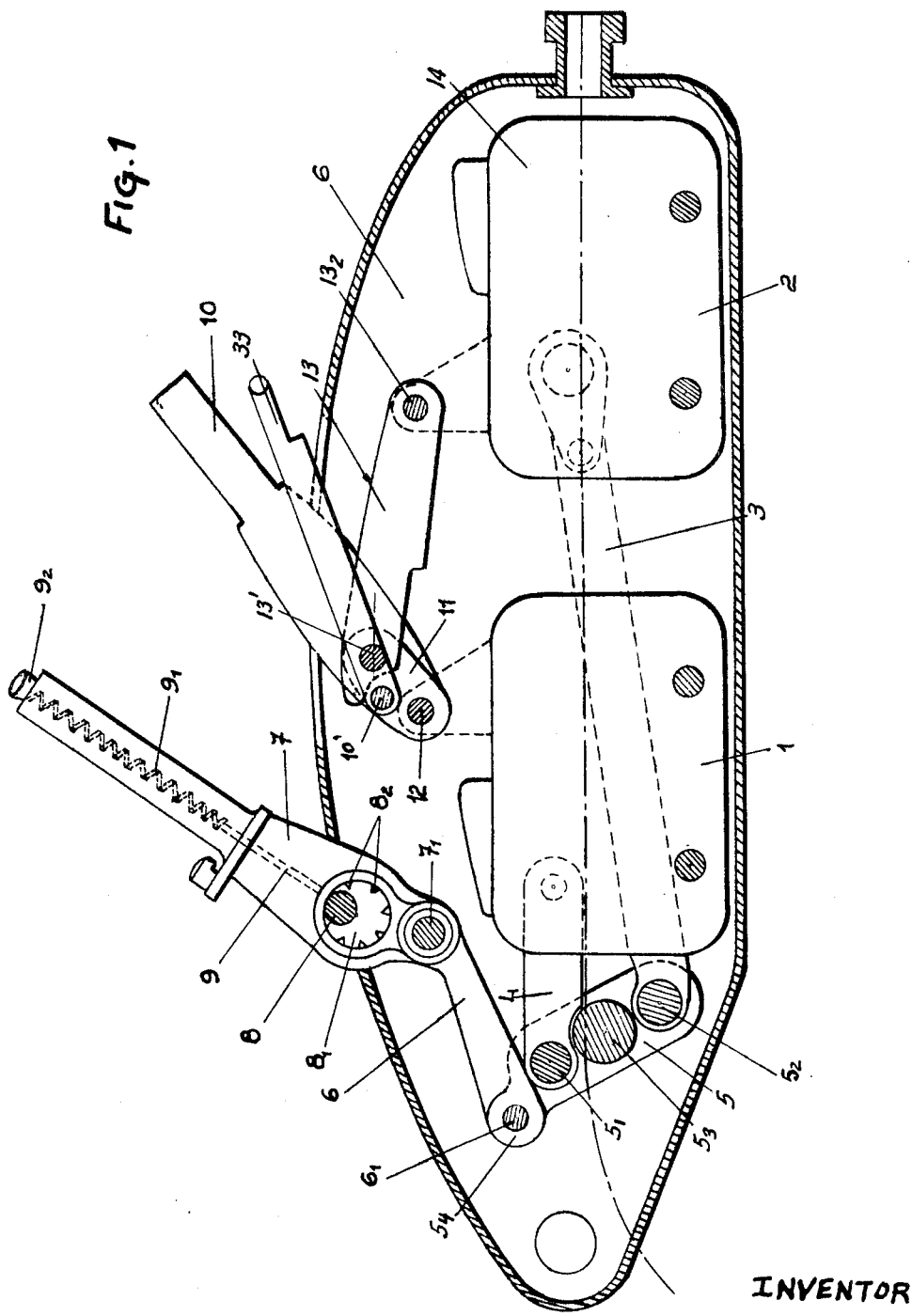
Figure 2:
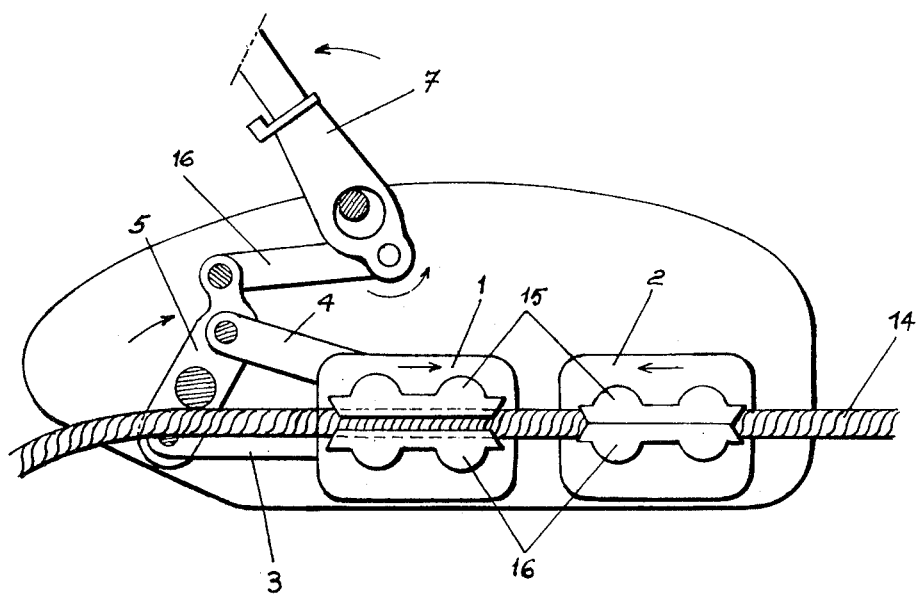
Figure 3:
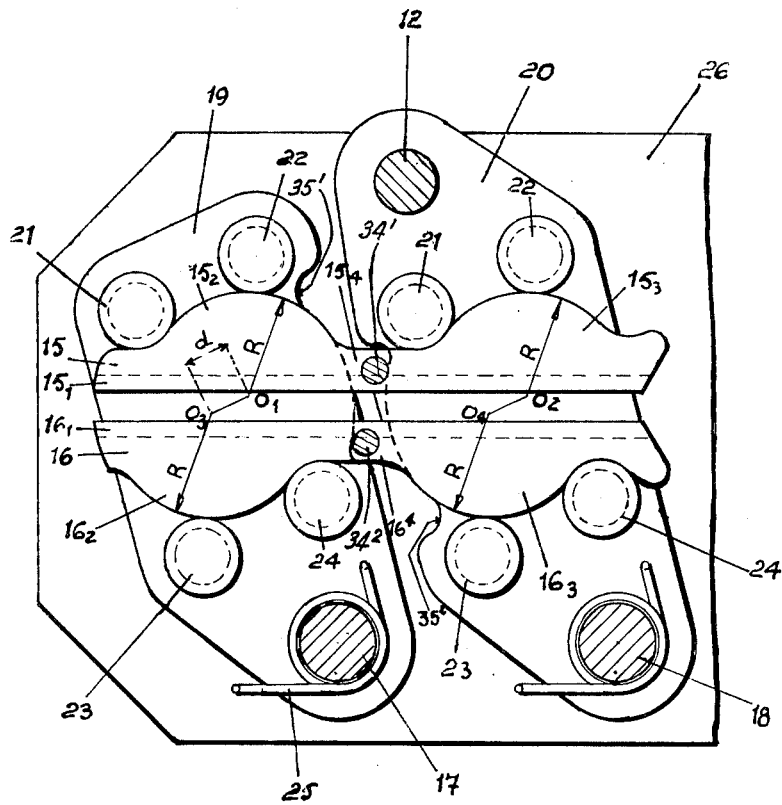
Figure 4:
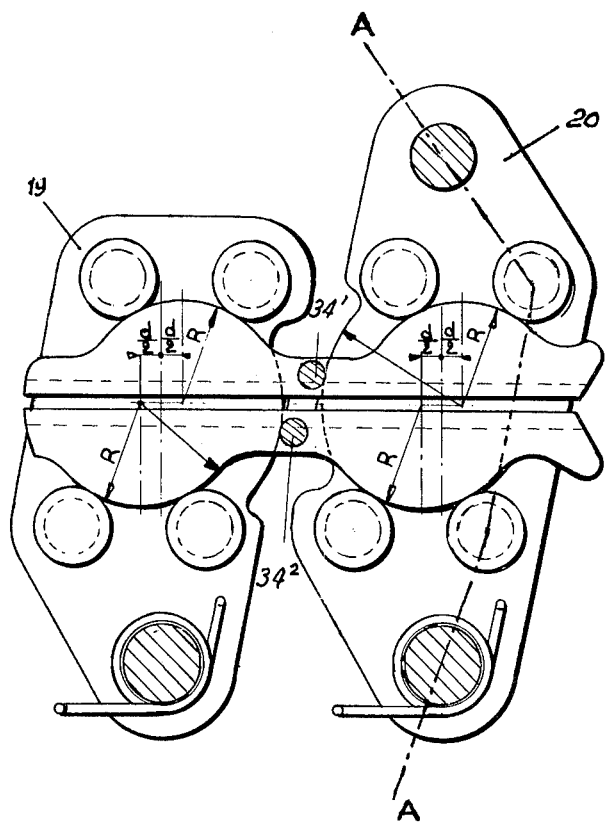

Other objects and advantages will be revealed by the following description and the attached drawings, in which:

FIGURE 1 shows a cross-section of an example of embodiment of a hauling and hoisting appliance according to the invention, FIGURE 2 is another view of the hauling appliance, FIGURE 3 shows a self-tightening clamp in the open position, FIGURE 4 shows the clamps of FIGURE 3 in a mean open position, FIGURE 5 shows the clamps of FIGURE 3 in a closed position, FIGURE 6 shows the self-tightening clamp of FIGURE 5 in section along the line A—A, FIGURE 7 shows another form of embodiment of the self-tightening clamps, FIGURE 8 shows the system of the forces in equilibrium acting on one of the tightening side-plates.

The self-tightening clamps according to the invention, can, for example, be arranged in an assembly such as shown in FIGURE 1 so as to form a hauling and hoisting appliance that is simple to make and hence of low cost price. This appliance comprises two self-tightening clamps 1 and 2 whose pivoting elements are connected by means of connecting rods 3 and 4 to a double crank 5. These connecting rods 3 and 4 are actually pivotally mounted by their ends on spindles $5_1$, $5_2$ fixed on the double crank 5 which itself pivots at $5_3$ on fixed elements integral with the casing 6 of the appliance.

This double crank 5 also comprises an extension $5_4$ inside which the spindle $6_1$ of a connecting rod 6 pivots whose other end pivots around a spindle $7_1$ made at the end of an operating lever 7. This operating lever 7 pivots on an eccentric $8_1$ of a spindle 8 and the position of the eccentric can be regulated so as to alter the length of the lever arm and thus the force developed on the lever for producing the hauling movement. The means enabling the positioning of the eccentric are formed by a rod 9 thrust by a spring $9_1$ so that by acting on the end $9_2$ of this spindle, the object can be placed at its other end, in one or other of the perforations $8_2$ made in the eccentric $8_1$. A reversing device can also be provided, consisting of a lever 10 hinged, on the one hand, around a spindle 12 on the extended end of one of the tightening side-plates of the clamp 1, and on the other hand, around a spindle $13_1$ remote from the spindle 12, on one of the ends of a small connecting rod 13 hinged at its other end on the extension of one of the tightening side-plates of the clamp 2. A spindle $10_1$ traversing the lever 10 half-way from the spindles 12 and $13_1$ enables the simultaneous opening to be effected of the jaws of both clamps, by means of a handle 33 secured to that spindle $10_1$ and able to be actuated from outside the casing.

The cable or section hauled by this appliance is schematized at 14 and passes successively into the two self-tightening clamps 1 and 2.

The working of this hoisting appliance is as follows:

By rocking the lever 7, the rocking of the crank 5 is produced around the spindle $5_3$ which sets up simultaneous displacements and in reverse directions of the two clamps 1 and 2 mechanically and respectively connected to the crank 5 by the connecting rods 3 and 4.

In FIGURE 2, the hauling appliance is shown whereas the operating arm 7 is rocking from right to left. In this case, the jaws 15 and 16 of the clamp 2 are engaged by self-tightening with the cable 14 and this displacement to the left. During this time, the clamp 1 shifts from left to right sliding on the cable with a residual tightening stress set up by the permanent action of internal springs (see 25, FIGURE 3).

The self-tightening clamps according to the invention are shown in detail in FIGURES 2, 4, 5 and 6.

Each of these clamps 1 and 2 chiefly consists of two jaws 15 and 16 placed one above the other and each provided with a longitudinal groove $15_1$ and $16_1$ made to the shape of the cable or section 14 to be hauled.

These jaws 15 and 16 each respectively comprises two cylindrical bearings $15_2$, $15_3$ and $16_2$, $16_3$. These jaws 15 and 16 placed opposite to each other are arranged between four side-plates pivotally mounted two by two on spindles 17 and 18.

In FIGURES 3, 4 and 5 two pivoting side-plates 19 and 20 are shown, the two side-plates having been removed for a better understanding of the drawing. The side-plates enclosing the jaws are connected two by two by rollers 21 and 22, 23 and 24.

The rollers 21 and 22 placed at the top part of the side-plates 19 and 20 are intended to be in permanent contact with the cylindrical bearings $15_2$, $15_3$ of the jaws whereas the rollers 23, 24 of the side-plates 19 and 20 are intended to be in permanent contact with the cylindrical bearings $16_2$ or $16_3$ of the jaw 16.

The upper rollers 21, 22 as well as the lower rollers 23 and 24 of the side-plates 19 or 20 are arranged on these side-plates so that the centers $0_1$, $0_3$ and $0_2$, $0_4$ of the cylindrical bearings $15_2$, $16_2$ and $15_3$, $16_3$ are offset for a "$d$" distance, the radius of these cylindrical bearings being shown by arrows R in the drawings. It will thus be seen that owing to the fixed position of the upper 21, 22 and lower 23, 24 rollers in relation to the side-plates 19 and 20 which carry them, the centers $0_1$, $0_2$ of one of the couples of cylindrical bearings belonging to one of the jaws 15 has a constant offset in relation to the corresponding centers $0_3$, $0_4$ of the couple of bearings belonging to the other jaw 16.

The ends of the jaws 15 and 16, allowing for the offset of the cylindrical bearings $15_2$, $15_3$ in relation to the corresponding cylindrical bearings $16_2$, $16_3$ are arranged in the alignment of each other so that the cable is tightened between these jaws for its whole length.

The cylindrical bearings $15_2$, $15_3$ or $16_2$, $16_3$ of the jaws 15 or 16 are joined together by a parallelepipedic portion $15_4$, $16_4$ of a maximum width compatible with the angular development that is effective of the cylindrical bearings.

The spindles 17 and 18 provided on each of the clamps 1 and 2 and acting as the articulation for the mobile side-plates 19 and 20 are so arranged as to be respectively situated on the mediative of the "$d$" straight line of distance separating the centers $0_1$, $0_3$ and $0_2$, $0_4$ of the cylindrical bearings $15_2$, $15_3$, $16_2$, $16_3$.

Flexion springs 25 wound around articulation spindles 17 and 18 and bearing on the one hand on the exteral side-plates 26, and on the other, on the oscillating side-plates 19 or 20 hold the jaws 15 and 16 in their closed position so long as no external force set up by the reversing lever 10 does not oppose their action.

The rollers 21, 22, 23, 24 in permanent contact with the cylindrical bearings of the jaws 15 and 16 on which they run, are made of a central cylindrical portion 27 enclosed by two cylindrical portions $27_1$, $27_2$ of a diameter less than the diameter of the portion 27. These cylindrical portions $27_1$ and $27_2$ revolve inside apertures also cylindrical made inside the pivoting side-plates 20 and $20_1$ (see FIGURE 5). This arrangement of rollers by a central cylindrical bearing 27 enclosed by two cylindrical parts $27_1$, $27_2$ of smaller diameter allows the diminishing of the friction torque of these parts against the side-plates 20, $21_1$ so as to facilitate their rotation.

On the other hand, these rollers have previously received a self-lubricating treatment on their ends, this treatment being formed, for example, by a plastic coating and facilitating their rotation in the corresponding bores of the pivoting side-plates 20 and $20_1$.

These self-tightening clamps operate in the following manner:

Owing to the "$d$" offset existing between the centers $0_1$, $0_3$ and $0_2$, $0_4$ of the cylindrical bearings, the pivoting movement of the tightening side-plates 19 and 20 around the spindles 17 and 18 sets up relative reverse movements of the centers $0_1$, $0_2$ and $0_3$, $0_4$ of the cylindrical bearings.

Thus, when the side-plates 19 and 20 pivot to the right around the spindles 17 and 18 the right-hand $0_1$, $0_3$ and $0_2$, $0_4$ successively place themselves in the positions shown in FIGURES 3, 4 then 5; this explains the tightening of the jaws 15 and 16. During these pivotings, the four couples of rollers bear on the four cylindrical bearings $15_2$, $15_3$, $16_2$, $16_3$ rolling on these cylindrical bearings thus bringing together the grooves $15_1$ and $16_1$ of the two jaws 15 and 16.

The jaws 15 and 15 thus finally come into contact with the tightening element 14 on which they effect a tightening previously determined by the action of the springs 25 on these jaws.

This tightening previously is such that the friction force that it determines between the jaws 15 and 16 and the cable 14 to be held is greater than the axial force that must be applied by the cable on the jaws to cause the rotation of the self-tightening side-plates. The tightening action is actually proportional to the increase of the axial force of the jaws tending to drive the jaws (see FIGURE 7).

In FIGURE 8, S represents the equal and opposed reaction to the tightening stress of the jaws on the cable; F is the axial force applied to the cable, "$d$" being the distance from the centers of the cylindrical bearings $0_1$, $0_3$ and L the distance of the articulation axis 17 to the straight line $0_1$, $0_3$ of distance $d$, (this straight length line L being on the mediative of the straight line $0_1$, $0_3$).

By stating by B, the pivoting angle made by the side-plate 19 and by K a mechanical coefficiency output, we may establish the following equation:

$KFL \cos B = Sd \cos B$ being $$\frac{S}{F} = \frac{KL \cos B}{d \cos B} = \frac{KL}{d} = \text{constant}$$

This formula thus shows that the ratio of the tightening force of the jaw to the sliding force of the cable is constant, i.e., that the increase of the action of the tightening force is proportional to the increase of the axial force produced by the cable 14.

On both lateral faces of the jaws 15 and 16 there are also lateral recoil studs $34_1$ and $34_2$ or abutments integral with these jaws 15 and coming into contact with circular sections $35_1$, $35_2$ made in the pivoting side-plates 19 and 20, each of the circular sections have the same center as one of the cylindrical bearings $15_3$, $16_2$ belonging to the jaw in question.

This arrangement thus obliges the jaws 15 to 16 to go along with the pivoting movement of the side-plates 19 and 20 for tightening and releasing.

These self-tightening clamps can also be made in the way shown in FIGURE 1. Actually, in this case, the rolling rollers used in the example of embodiment of FIGURES 2 to 5 have been replaced by cylindrical segments 28, 29, 30, 31 held between oscillating side-plates 19 and 20 by spindles. Likewise, in this case, the positioning of the cylindrical segments 28, 29, 30, 31 on the sideplates 19 and 20 is so arranged that a constant offset exists between the centers of the cylindrical bearings $15_2$, $16_2$ and $15_3$, $16_3$ of the jaws 15 and 16.

In this case also, these segments can receive a self-lubricating treatment, for example, by a plastic coating, so that they are applied by their inner cylindrical surface to the smooth parts of the bearings of the jaws and slide along the latter during tightening.

The self-tightening clamps according to the invention thus have an advantage resulting from the simplicity of the manufacturing of the jaws as well as their low cost price, seeing that these jaws have a uniform thickness, which enables them to be made out of drawn bars already provided with the longitudinal groove $15_1$, $16_1$.

Actually, after cutting off these bars, they can be juxtaposed in series, so that the cylindrical bearings can be transversally machined with a form-milling.

The tightening segments 28, 29, 30, 31 can also be made from constant section bars obtained by drawing and provided with two passage holes for the spindles 32.

Also, to this simplicity of manufacture, there is added a better mechanical rightening output by replacing, to a certain extent, the sliding friction of the rollers by a rolling friction.

What I claim is:

1. Self-tightening clamp for a hauling or hoisting appliance having a cable or the like comprising a pair of cooperating jaws, said jaws having inner cooperating surfaces for engaging and gripping a cable, each jaw having an outer surface provided with cylindrical bearings machined in the actual thickness of the jaw and extending the width thereof, and means controlling the tightening action of the jaws on the cable, said means comprising pivoting side plates pivotally arranged on opposite sides of the jaws and means carried by the side plates and disposed in constant rolling contact with substantially the entire width of the cylindrical bearings of one jaw and means carried by the side plates and disposed in constant rolling contact with substantially the entire width of the cylindrical bearings of the other jaw.

2. Self-tightening clamp as claimed in claim 1, wherein both of said last means carried by the side plates includes rollers.

3. Self-tightening clamp as claimed in claim 1, wherein both of said last means carried by the side plates includes cylindrical segments.

4. Self-tightening clamp as claimed in claim 1, including lateral studs on the jaws engaging the pivoting side plates to force the jaws to follow the pivoting movement of the side plates.

5. Self-tightening clamp as claimed in claim 1, wherein said pivoting side plates have cylindrical profiles and lateral studs on the jaws engaging said cylindrical profiles of the pivoting side plates to force the jaws to follow the providing movement of the side plates.

6. Self-tightening clamp as claimed in claim 5, wherein said cylindrical profiles have the same centers as the cylindrical bearings of the corresponding jaws.

7. Self-tightening clamp as claimed in claim 1, whereing both of said last means carried by the side plates includes rollers, said rollers having central cylindrical portions and end portions of reduced diameters, the central portions being in contact with the cylindrical bearings and said side plates having apertures in which the end portions are journalled.

8. Self-tightening clamp as claimed in claim 1, wherein said controlling means further includes a control lever and a linkage arrangement connecting the pivoting side plates to the control lever.

9. Self-tightening clamp for a hauling or hoisting appliance comprising jaws, means for controlling the tightening of the jaws, each jaw being provided with cylindrical bearings machined in the actual thickness of said jaws, the means for controlling the tightening of the jaws comprising pivoting side plates arranged in pairs, each pair of pivoting side plates comprising two upper rollers applied against a cylindrical bearing of a jaw and two lower rollers applied against a cylindrical bearing of another jaw, and the upper rollers and the lower rollers being so arranged that the centers of said cylindrical bearings of the jaws pressing on the rollers of a pair of side plates are offset a distance one relative to the other.

10. Self-tightening clamp for a hauling or hoisting appliance comprising jaws, means for controlling the tightening of the jaws, each jaw being provided with cylindrical bearings machined in the actual thickness of said jaws, the means for controlling the tightening of the jaws comprising pivoting side plates arranged in pairs, each pair of pivoting side plates comprising two upper cylindrical segments applied against a cylindrical bearing of a jaw and two lower cylindrical segments applied against a cylindrical bearing of another jaw, the upper cylindrical segments and the lower cylindrical segments being so arranged that the centers of said cylindrical bearings of the jaws pressing on the cylindrical segments of a pair of side plates are offset a distance one relative to the other, shaft members, each shaft member receiving a pair of pivoting side plates, said shaft members being located on the median of the straight line corresponding to the offset of the centers determined by the position of the upper and lower cylindrical segments, spring means disposed around the shaft members of the pairs of side plates and tending to maintain the jaws in a closed position, and two fixed side plates receiving said shaft members of the pairs of side plates and enclosing said pairs of movable side plates.

11. Self-tightening clamp for a hauling or hoisting appliance comprising jaws, means for controlling the tightening of the jaws, each jaw being provided with cylindrical bearings machined in the actual thickness of said jaws, the means for controlling the tightening of the jaws comprising pivoting side plates arranged in pairs, each pair of pivoting side plates comprising two upper rollers applied against a cylindrical bearing of a jaw and two lower rollers applied against a cylindrical bearing of another jaw, the upper rollers and the lower rollers being so arranged that the centers of said cylindrical bearings of the jaws pressing on the rollers of a pair of side plates are offset a distance one relative to the other, shaft members, each shaft member receiving a pair of pivoting side plates, said shaft members being located on the median of the straight line corresponding to the offset of the centers determined by the position of the upper and lower rollers, spring means disposed around the shaft members of the pairs of side plates and tending to maintain the jaws in a closed position, and two fixed side plates receiving said shaft members of the pairs of side plates and enclosing said pairs of movable side plates.

12. Self-tightening clamp according to claim 11, wherein the rollers mounted between the pairs of side plates and pressing on the cylindrical bearings of the jaws comprise a central cylindrical portion located between two portions of smaller diameter, said smaller diameter cylindrical portions pivoting inside apertures provided in the side plates.

13. Self-tightening clamp according to claim 11, wherein said jaws are self lubricating and coated with plastic.

References Cited by the Examiner
UNITED STATES PATENTS

| | | | |
|---|---|---|---|
| 620,438 | 2/1899 | Fouts | 254—135 |
| 1,143,713 | 6/1915 | Dirstin | 254—76 |
| 1,447,456 | 3/1923 | Wright | 24—134 |
| 1,466,007 | 8/1923 | Walton | 24—134 |
| 2,585,101 | 2/1952 | Faure | 254—76 |
| 2,955,339 | 10/1960 | Richardson | 24—262 |
| 2,995,339 | 8/1961 | Persiaux | 254—76 |
| 3,061,263 | 10/1962 | Butler | 24—248 |
| 3,142,879 | 8/1964 | Faure | 24—134 |
| 3,143,192 | 8/1964 | Buchanan | 188—65.1 |

WILLIAM FELDMAN, *Primary Examiner.*

BOBBY R. GAY, *Examiner.*